July 9, 1968  G. V. DE MOULLIAC  3,391,799
AUTOMATIC COUPLING HEADS OF REDUCED HEIGHT FOR RAILWAY VEHICLES
Filed July 19, 1966  23 Sheets-Sheet 1

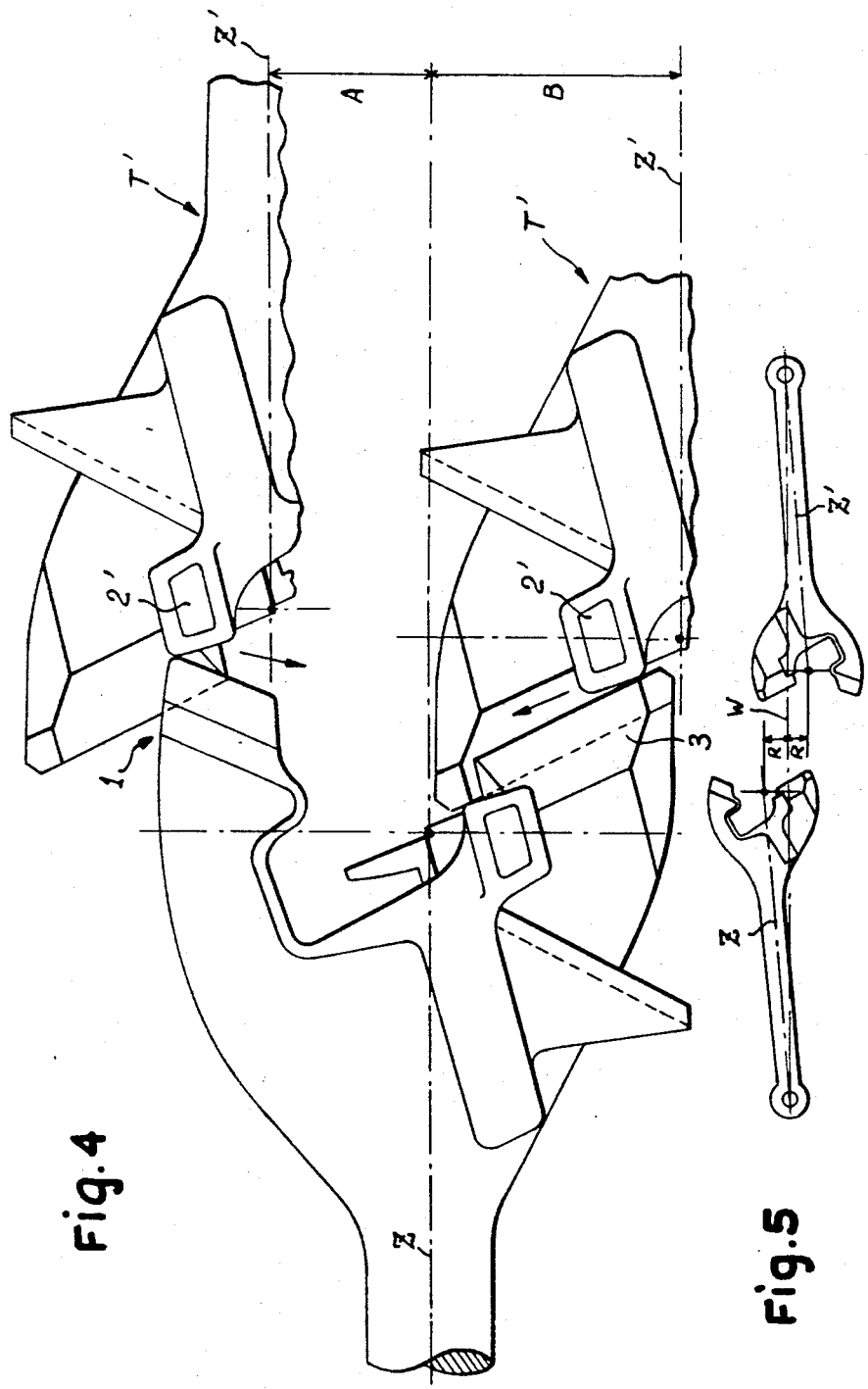

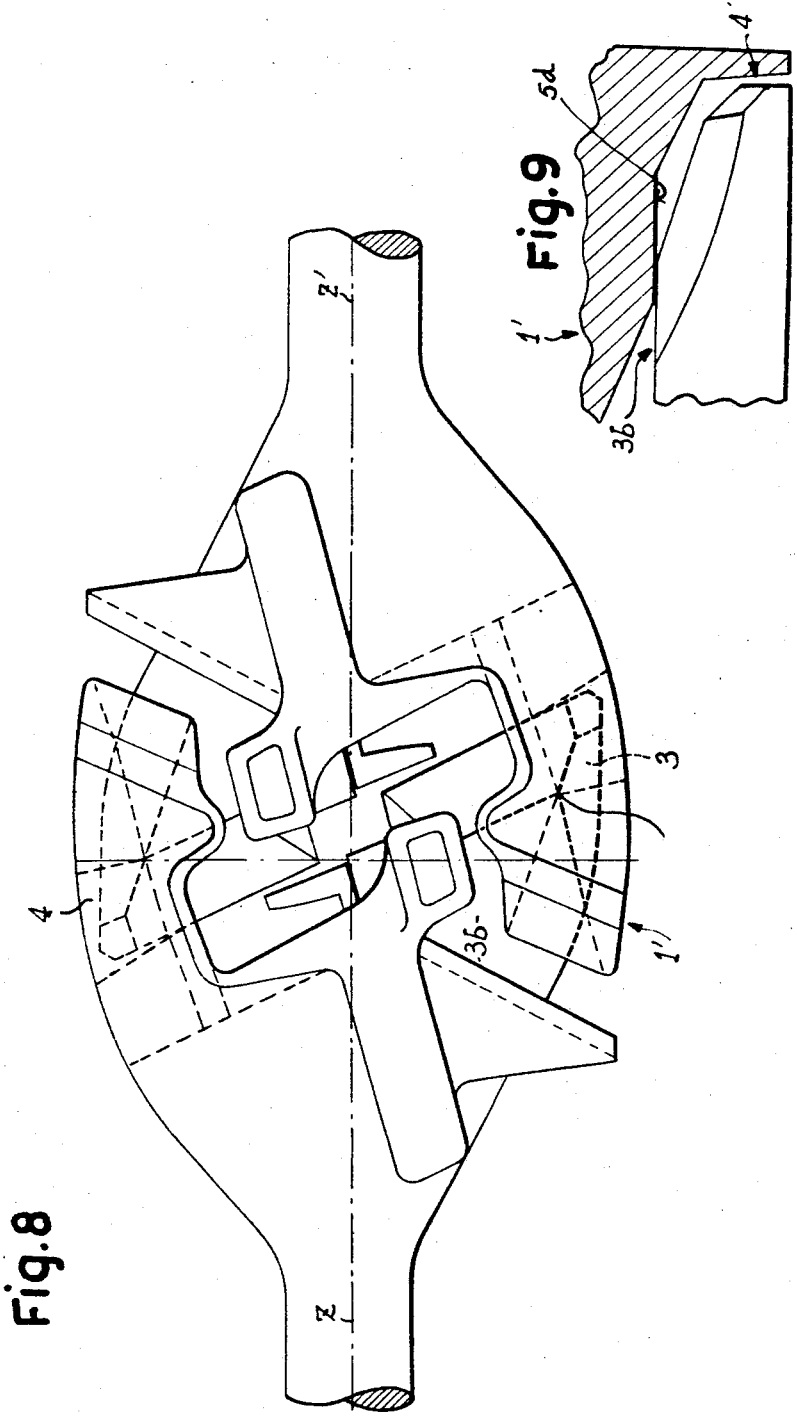

July 9, 1968  G. V. DE MOULLIAC  3,391,799
AUTOMATIC COUPLING HEADS OF REDUCED HEIGHT FOR RAILWAY VEHICLES
Filed July 19, 1966  23 Sheets-Sheet 13

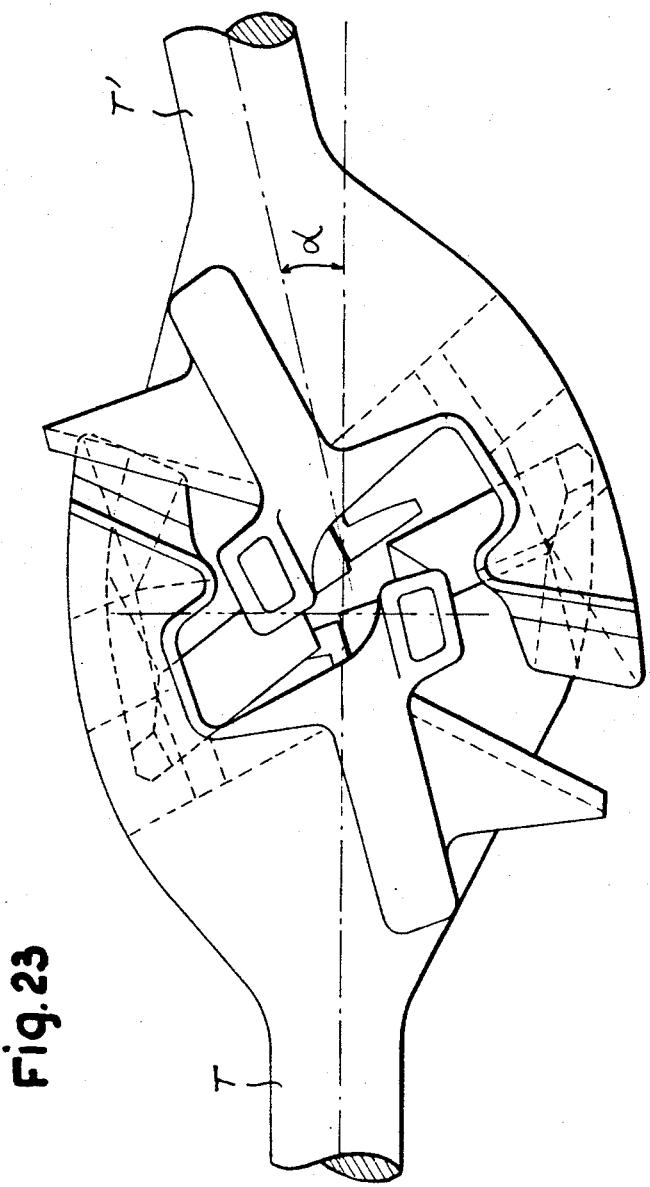

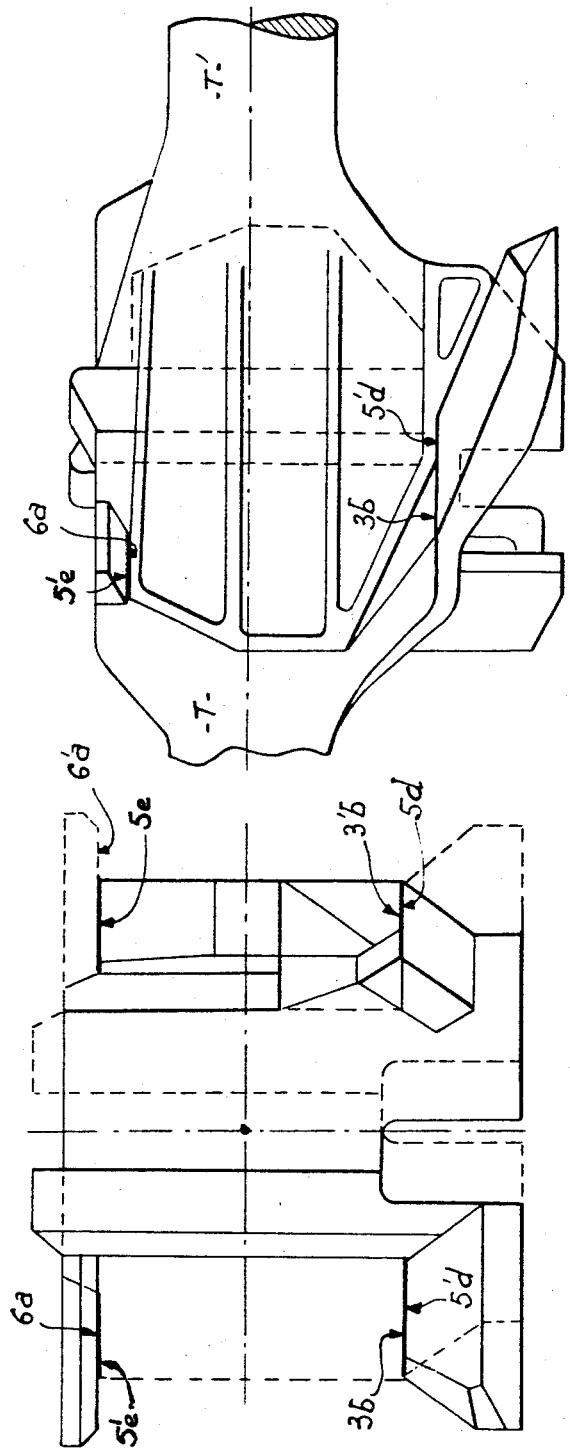

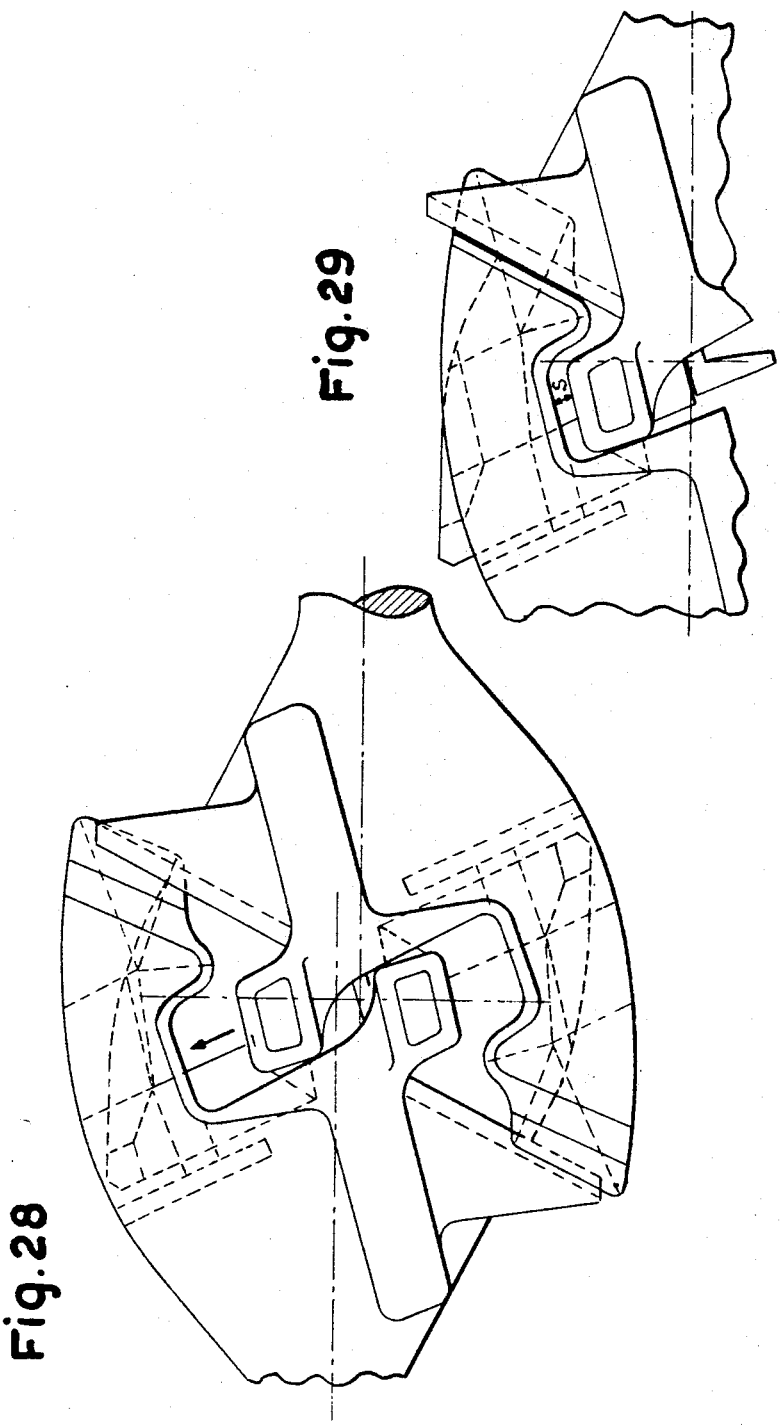

Fig.30
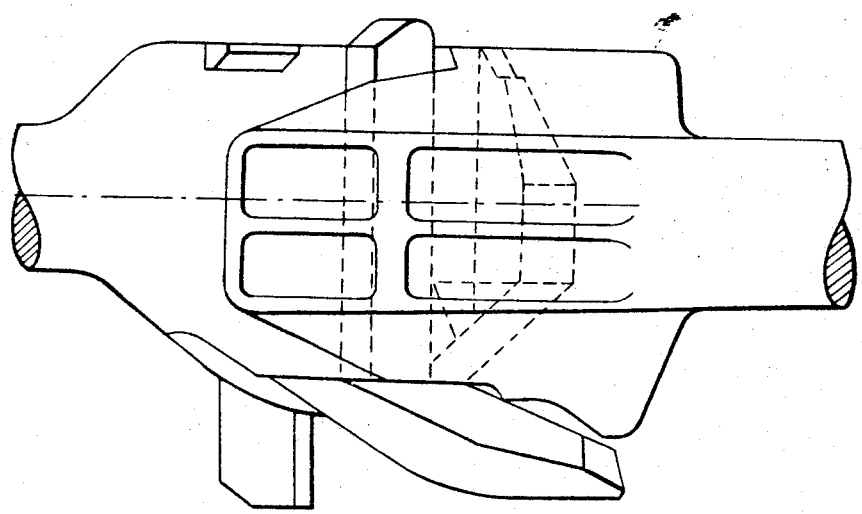
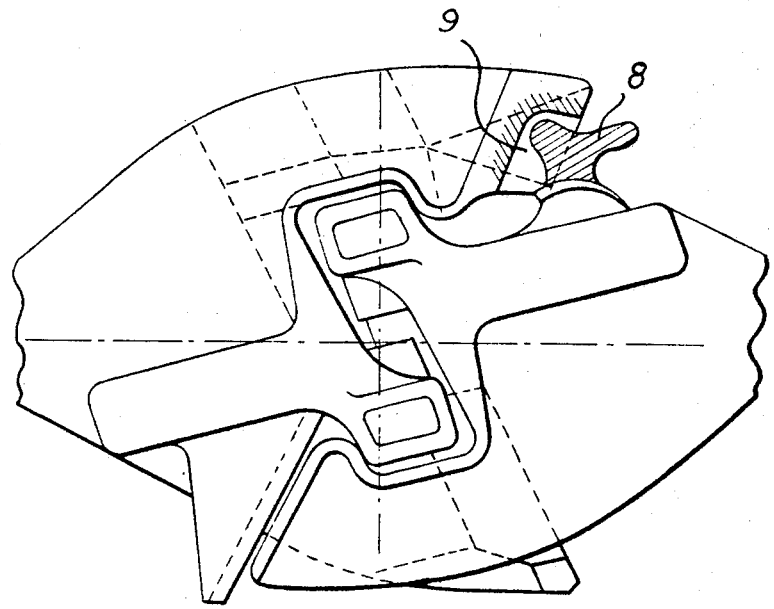
Fig.31

United States Patent Office 3,391,799
Patented July 9, 1968

3,391,799
AUTOMATIC COUPLING HEADS OF REDUCED HEIGHT FOR RAILWAY VEHICLES
Guy Valleteau de Moulliac, Argenteuil, France, assignor to Societe Generale Isothermos, Argenteuil, Val d'Oise, France, a French company
Filed July 19, 1966, Ser. No. 566,385
Claims priority, application France, July 22, 1965, 25,593
2 Claims. (Cl. 213—100)

ABSTRACT OF THE DISCLOSURE

Coupling head has on its front face a large hook-shaped coupling grip, a small prismatic grip, a horn projecting obliquely forwardly from beneath the small grip, and a vertical abutment face situated beneath and behind the large grip. Forward appendix on front face of large grip has group of upwardly-directed faces and a group of downwardly-directed faces. Rear appendix behind small grip has group of downwardly-directed faces. Horn has vertical face directed forwardly and inwardly, and a group of upwardly-directed faces.

The present invention relates to automatic coupling heads for use with central buffing and draft gear for railway vehicles of the type having on the front face a large grip in the form of a hook, a small grip in the form of a prism and a horn which projects forwards from under the small grip.

The coupling together of two railway vehicles is effected by means of these coupling heads, which are mounted on the two vehicles the one opposite the other in such a way that the large grip of the one head is able to couple with the small grip of the other head.

The two coupling heads are articulated to the two vehicles which it is desired to couple together, whereby the coupling heads are initially in positions relative to each other which depend on the positions of the two vehicles which, in turn, depend on the shape of the rail, the loading of the vehicles, and the like. Thus when the two vehicles approach each other for the coupling operation the two coupling heads can be displaced relative to each other in the horizontal plane, or in the vertical plane, or they can be at an angle to each other.

After the coupling heads have made first contact with each other the further movement of engagement must take place in such a way that the heads are correctly brought into line with each other and for this purpose it is known to provide means for guiding the heads to make their positions agree so that they can finally engage fully and lock together rigidly.

These guiding means define what the technologist calls "the horizontal field of action," the "vertical field of action," the "angular agreement in the horizontal plane," the "angular agreement in the vertical plane" or the "torsional adjustment" and the "rigidification" of the coupling heads.

It is known to provide these guiding means in the form of guiding faces suitably arranged on the front of the coupling head to co-operate with the corresponding faces of the other coupling head.

The present invention aims to provide guiding faces in such a way that contact between the two coupling heads is always obtained, or is most often obtained, in the form of a "contact between flats," that is to say an area contact rather than a line contact.

It is another aspect of the invention, as will be described below, that the co-operating faces which give the adjustment for a certain type of parallel or angular misalignment can comprise new kinds of faces fundamentally different from the faces which have hitherto been known for this purpose.

In general it should be understood that the coupling head according to the invention is characterised by new guiding faces and by the performing of new functions by the previously known faces, in order to reduce the overall dimensions of the coupling head, while at the same time still retaining all the advantageous qualities of the previously known coupling heads.

FIG. 4 is a view from above showing two coupling heads according to the invention of the type shown in FIG. 1, showing the two limiting positions so as to define the horizontal field of action;

FIG. 5 is a view from above of two coupling heads of the type shown in FIG. 1 and in this view the two heads are separated from each other and there is an angle between their longitudinal axes;

FIG. 8 is a view from above of two coupling heads which are level with each other, and the figure shows the coupling heads before they reach full engagement;

FIG. 9 is a detail, shown from the side, of the coupling process illustrated in FIG. 8;

Figure 1:
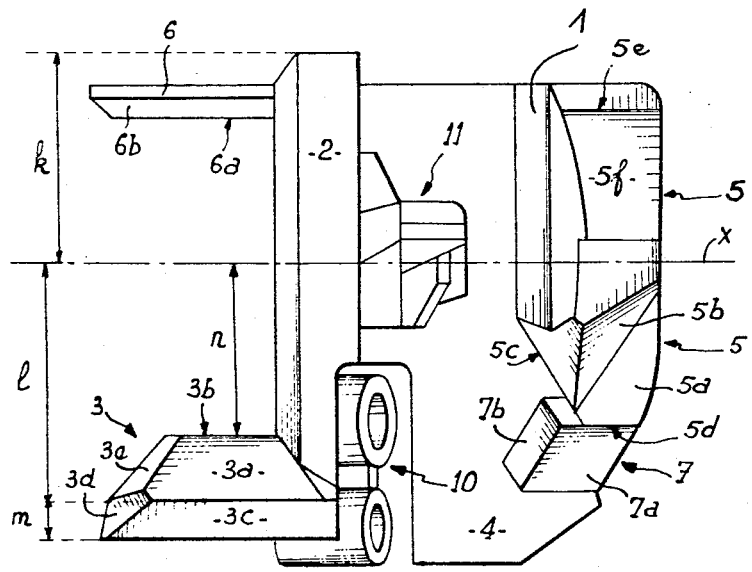
FIG. 1 is a diagrammatic view from in front of a version of the coupling head according to the invention.
Figure 2:
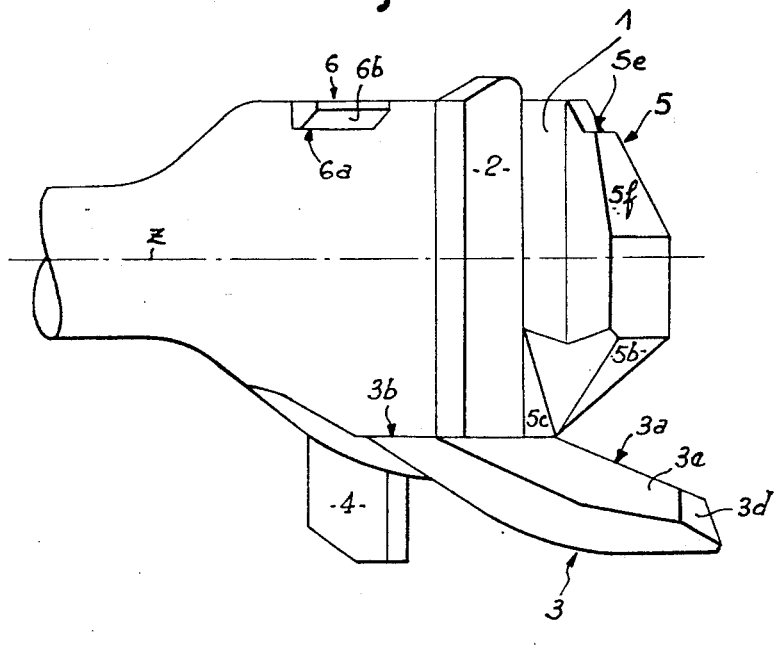
FIG. 2 shows the coupling head of FIG. 1 from the side in a plane parallel to the longitudinal axis of the head.
Figure 3:
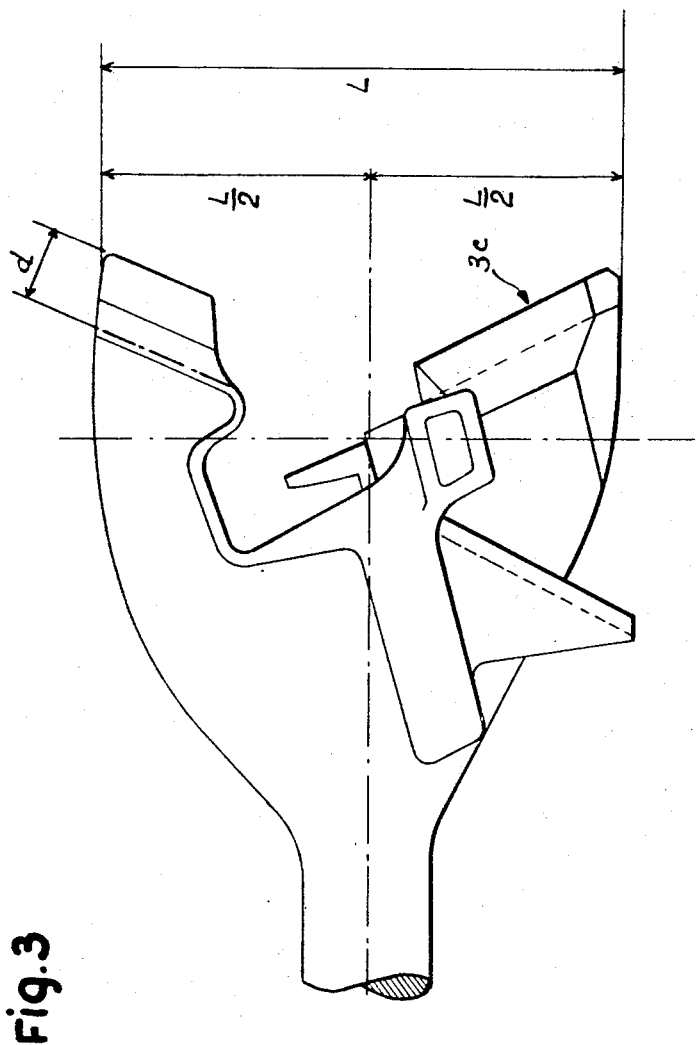
FIG. 3 is a view from above of the coupling head of FIG. 1.
Figure 15:
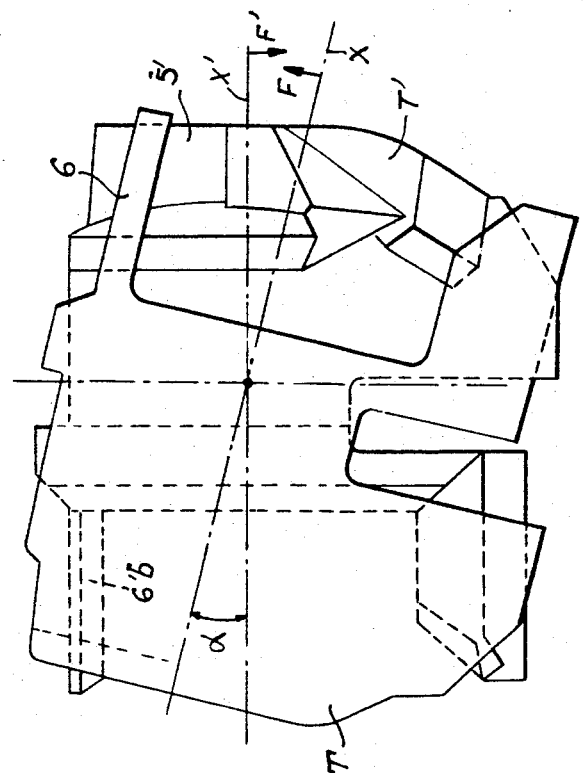
FIGS. 15 and 16 represent respectively corresponding front and side projections of two coupling heads which are level with each other but are inclined with respect to each other in the vertical plane.
Figure 16:
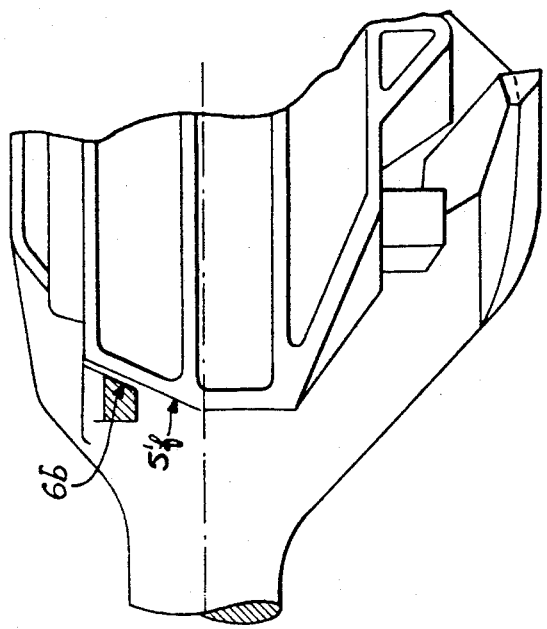
Figure 17:
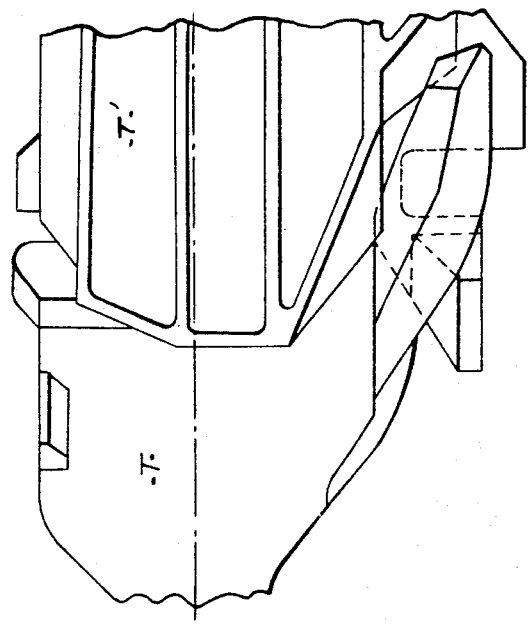
Figure 18:
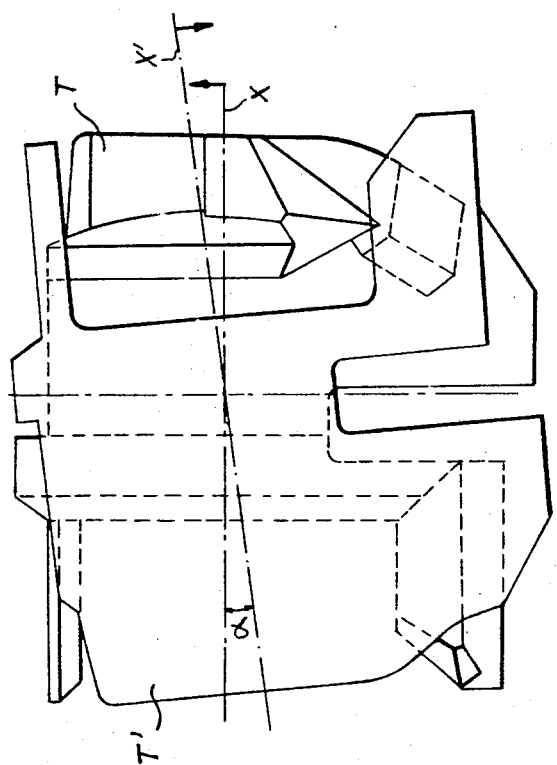
Figure 19:
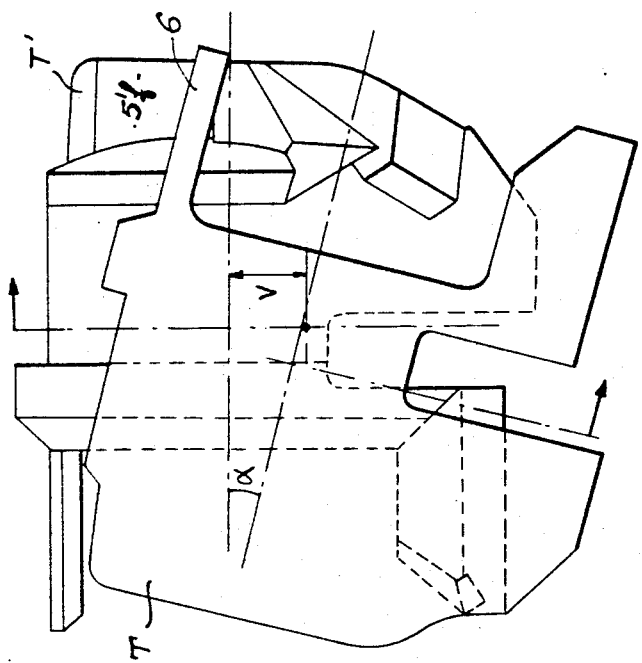
Figure 20:
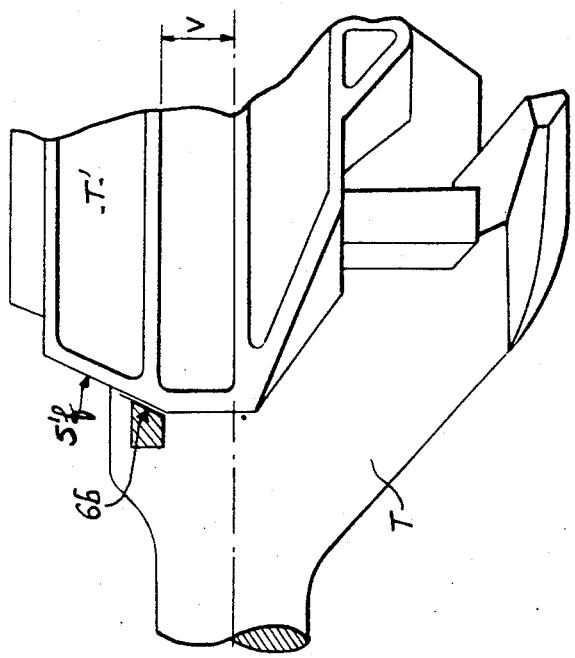
Figure 22:
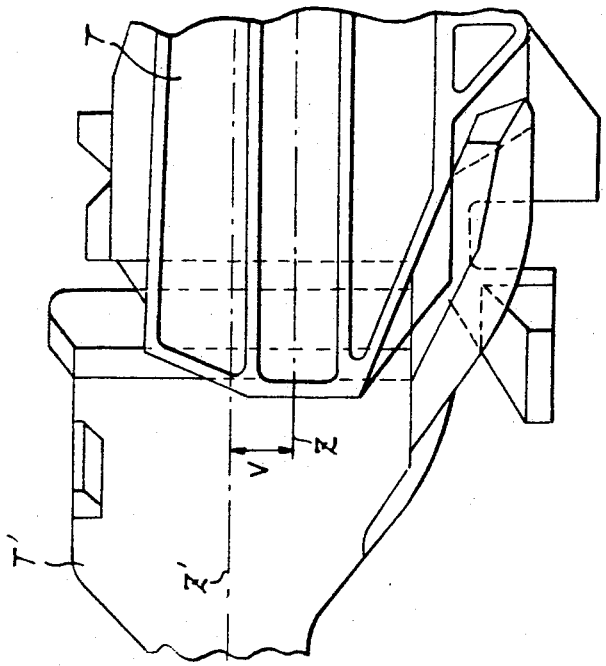
Figure 21:
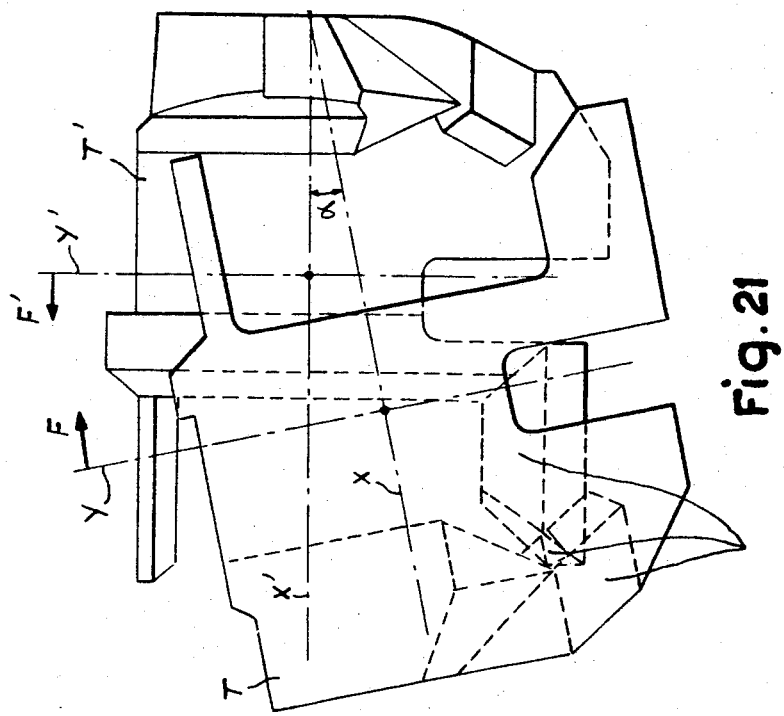
Figure 24:
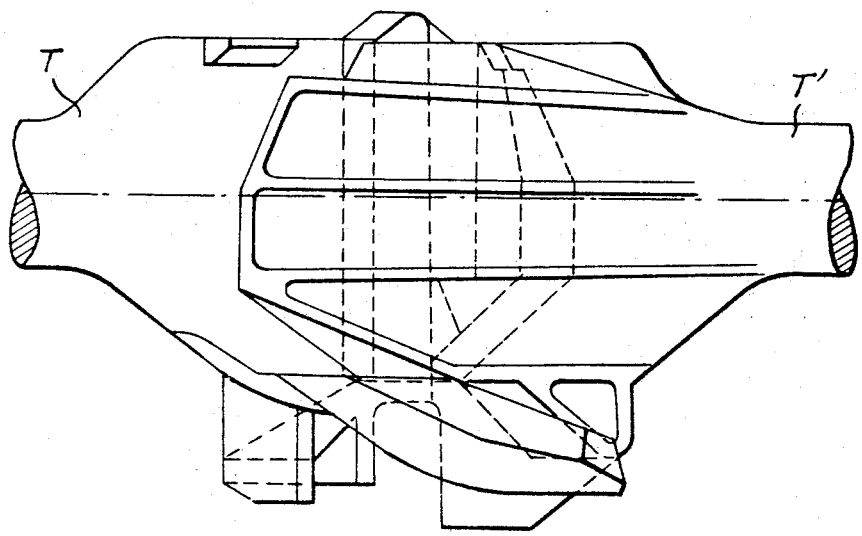
Figure 25:
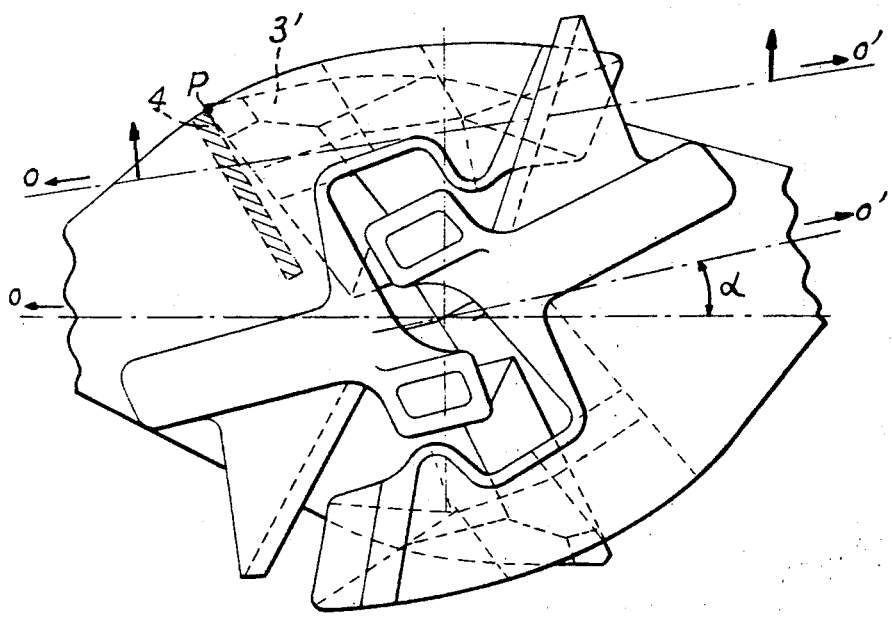
Figure 32:
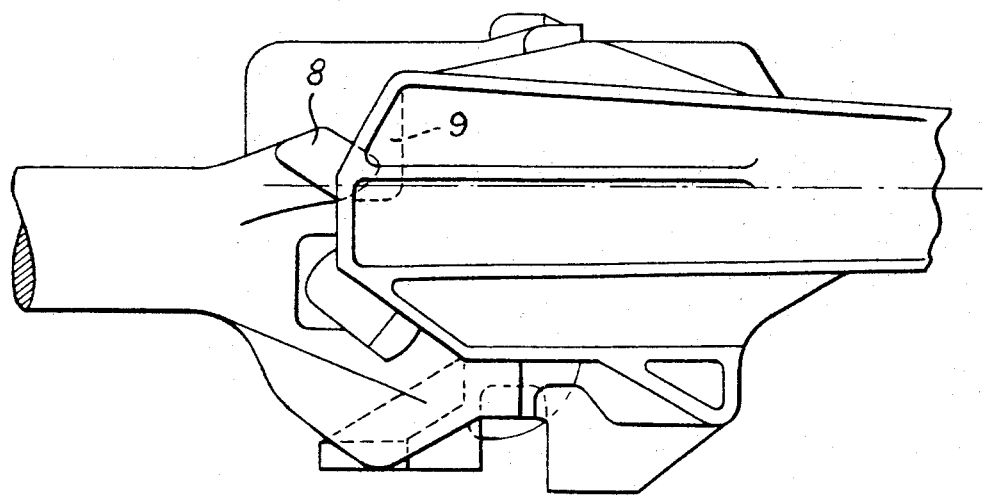
Figures 33, 34:
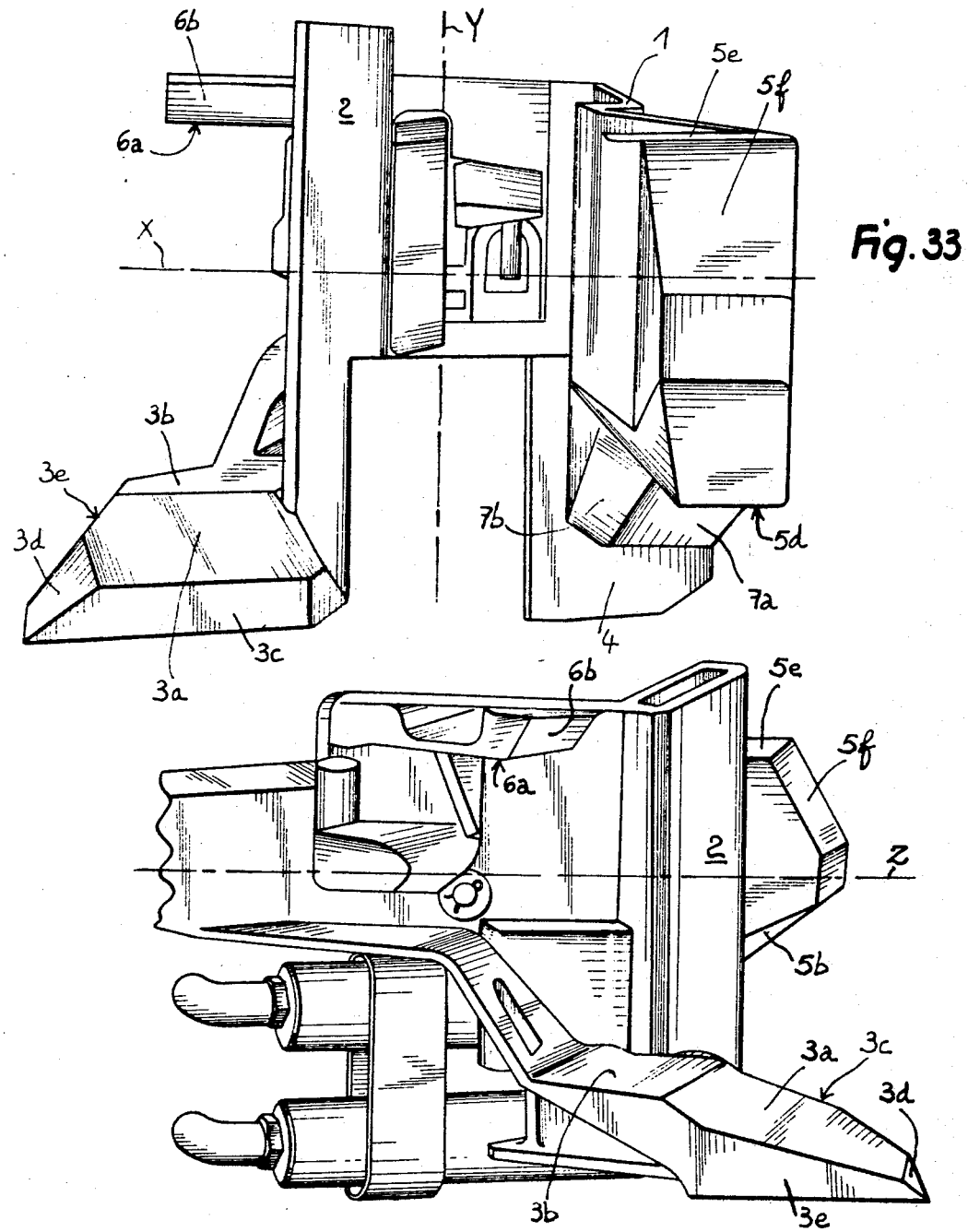
Figure 35:
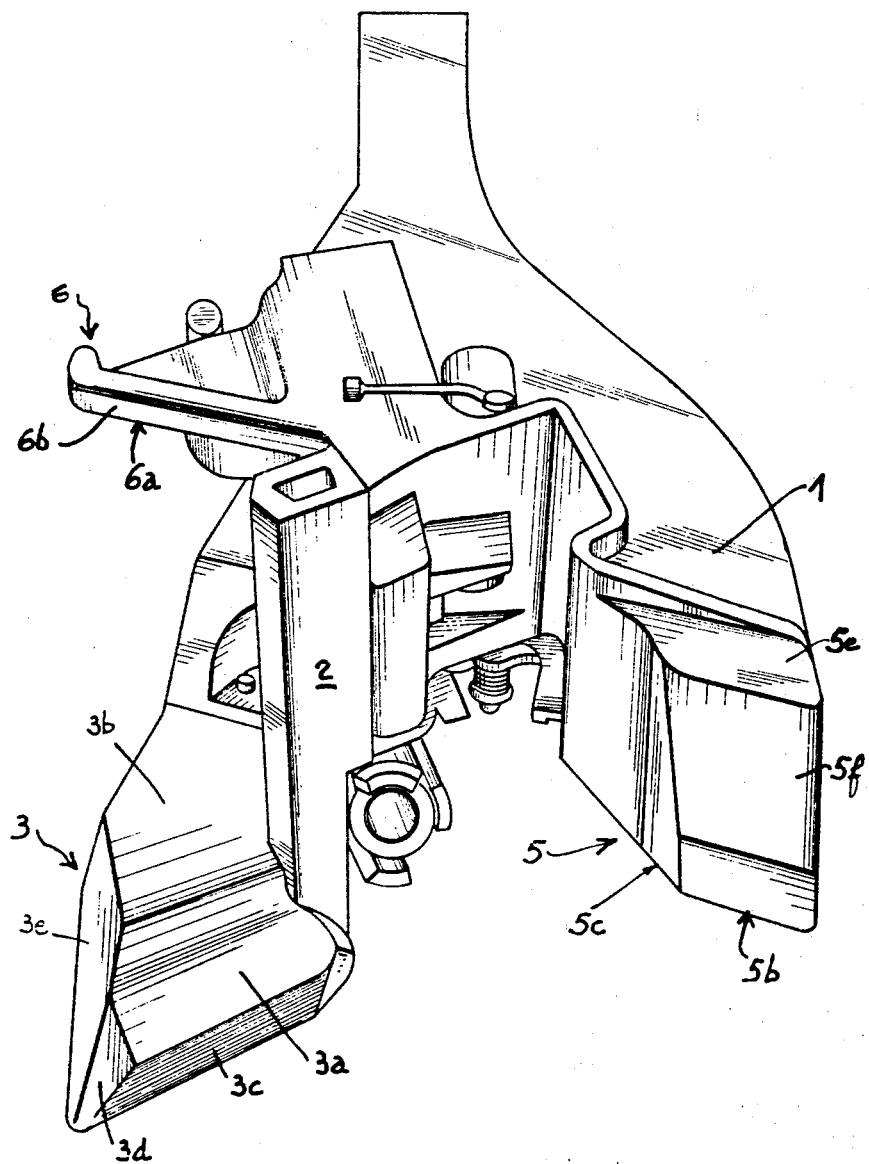
Figure 36:
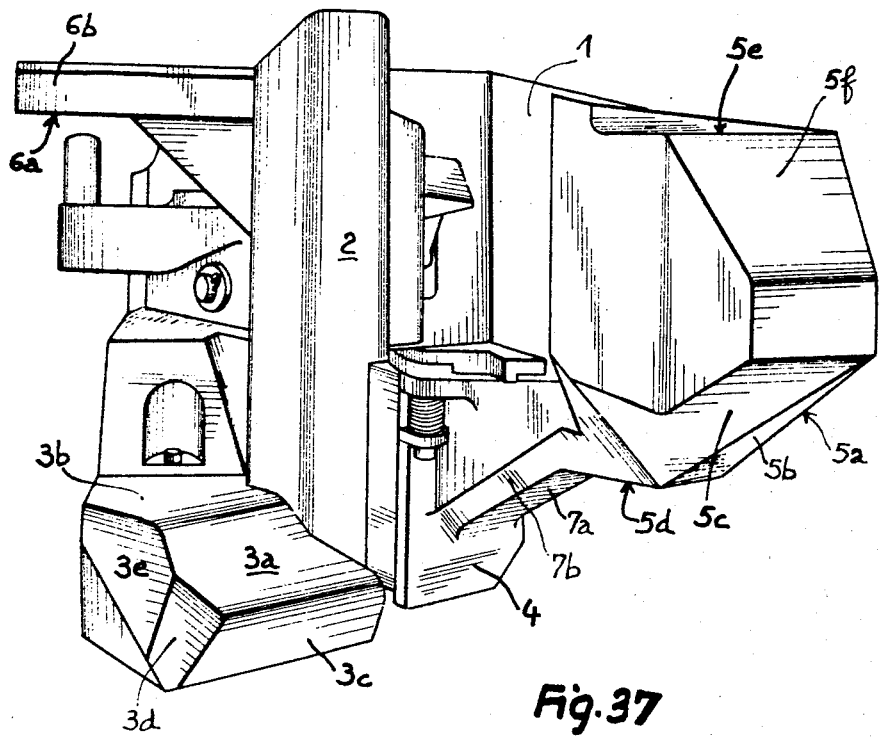
Figure 37:
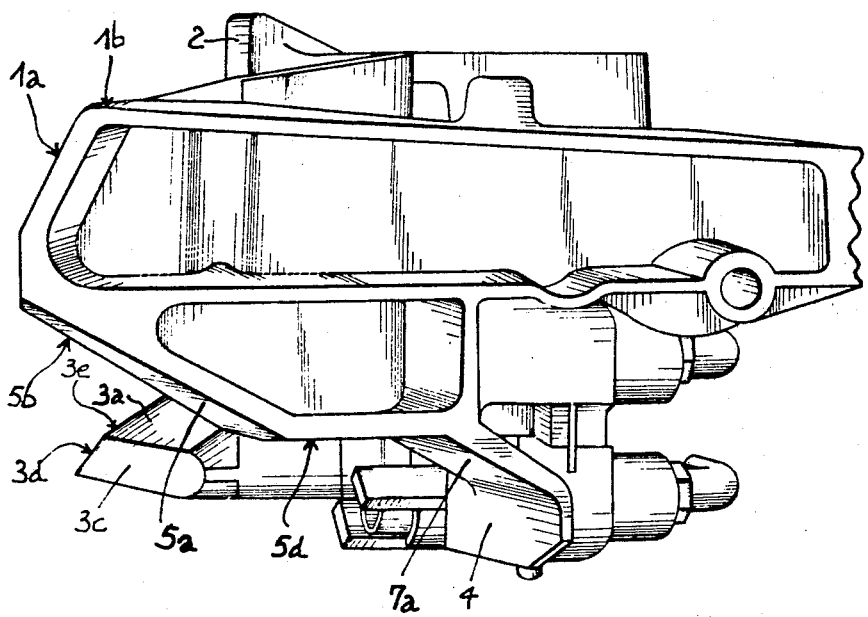
Figure 38:
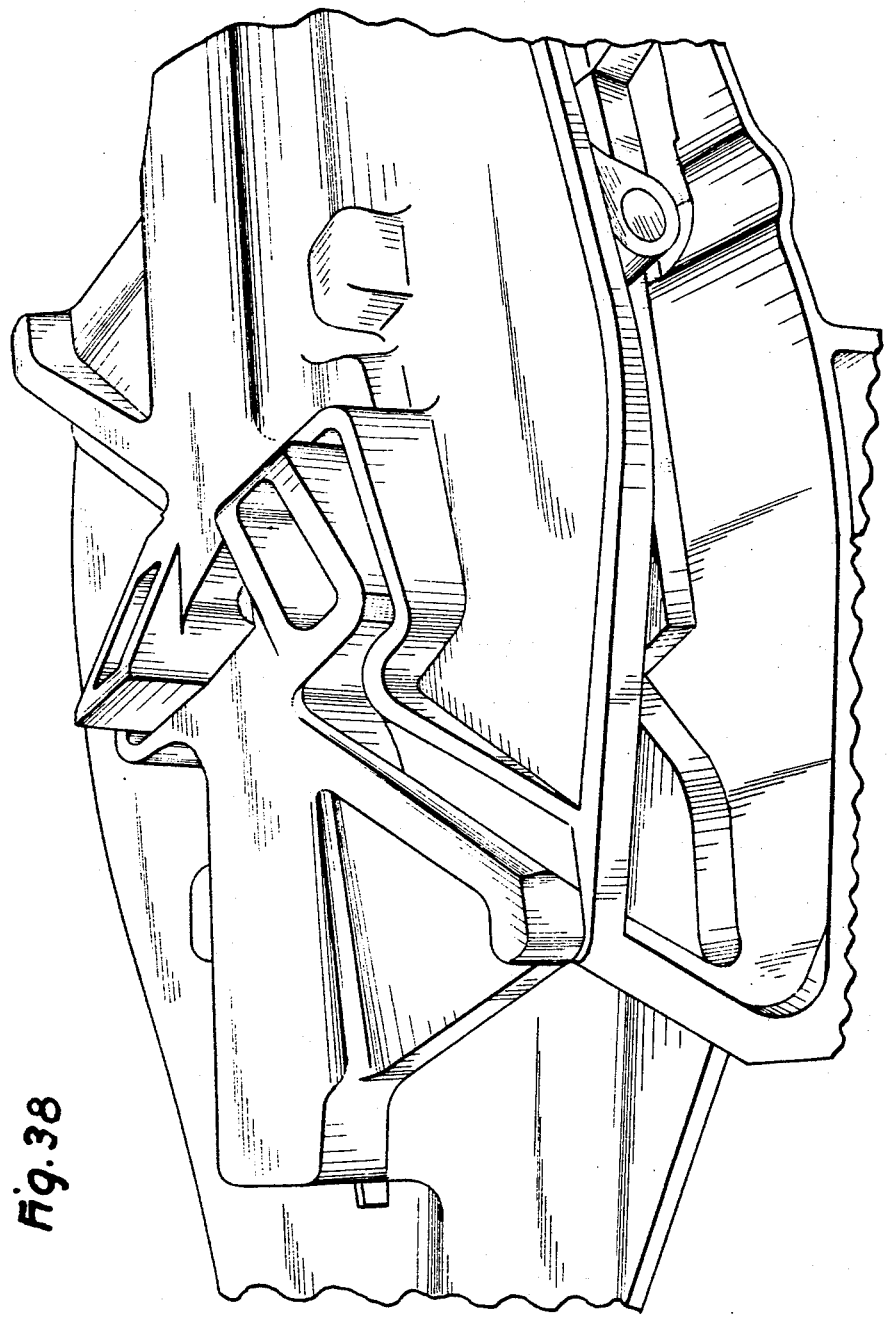

FIGS. 17 and 18 correspond to FIGS. 15 and 16 but in this case the relative inclination is in the opposite sense;

FIGS. 19 and 20 represent respectively front and side projections in the same plane of two coupling heads which are displaced and also inclined relative to each other in the vertical plane;

FIGS. 21 and 22 correspond respectively to FIGS. 19 and 20, but represent a displacement and an inclination in the opposite sense to that previously illustrated;

FIG. 23 is a view from above of two coupling heads which are on the same level but are angled in both the horizontal and the vertical plane;

FIGS. 24 and 25 show from the side and from above two coupling heads which are on the same level but form an angle in the horizontal plane;

FIGS. 26 and 27 show, from in front and from the side, two coupling heads which are locked rigidly together;

FIGS. 28 and 29 are views from above of two coupling heads sliding inwards towards each other, whereby in FIG. 29 the movement has advanced further;

FIGS. 30, 31 and 32 represent the engagement of a coupling head according to the invention with a Russian coupling head of the type SA 3. The figures show, from the side, from above and from the side the two coupling heads engaged together;

FIG. 33, which corresponds to FIG. 1, is a perspective view of a version of the coupling head shown diagrammatically in FIG. 1. The coupling head is seen from the front but dipping slightly downwards;

FIG. 34, which corresponds to FIG. 2, is a perspective view of the coupling head of FIG. 33, but seen from the horn side;

FIG. 35, which corresponds to FIG. 3, is a perspective view of the coupling head of FIG. 33, seen from in front and above;

FIG. 36 is a perspective view of the coupling head of FIG. 33, viewed diagonally from the horn side;

FIG. 37 is a perspective view of the coupling head of FIG. 33, seen from the large grip side; and FIG. 38 is a perspective view showing two coupling heads locked together.

The coupling head shown comprises, as usual, a large grip 1 in the form of a hook, a small grip 2 in the form of a prism, a horn 3 which projects obliquely forwards from underneath the small grip 2, an abutment or percussion face 4 situated underneath and behind the large grip.

The coupling head is distinguished by the presence of a forward projection 5 projecting from the front face of the large grip, and by a rearward projection 6 behind the small grip and above the axis of the coupling head. These two projections, and the horn of the coupling head, present the characteristic faces which co-operate with the corresponding analogous faces of the other coupling head.

More precisely, the characteristic faces of the coupling head according to the invention comprise the following (FIGS. 36 and 35):

On the front projection 5:

a group of faces 5e and 5f directed upwards
a group of faces 5a, 5b, 5c and 5d directed downwards On the rearward projection 6:

a group of faces 6a, 6b directed downwards, of which the face 6a is horizontal and the face 6b is sloping towards the rear On the horn forward of the small grip:

a vertical face 3c directed forwards and towards the interior of the coupling head
a group of faces 3a, 3b, 3d and 3e directed upwards Under the large grip, between the projection and the percussion face:

a face 7a directed downwards and forwards
a face 7b directed downwards and towards the interior of the coupling head.

These faces co-operate with the analogous faces of the other coupling head in order to centralise as necessary, in the sequence described below, the angular agreement in the vertical plane (correction of the coupling heads to bring their X axes into a horizontal plane), the agreement of level (to bring the two X axes of the two coupling heads to the same level) and the angular agreement in the horizontal plane (to bring the Z axes of the two coupling heads parallel to each other), before the two coupling heads lock together.

In the coupling head illustrated, the group of faces 5e and 5f directed upwards on the appendix 5 comprises:
   a horizontal face 5e
   a face 5f which slopes downwards forwards the group of faces 5a, 5b, 5c and 5d of the forward appendix 5 and directed downwards comprises:
   a face 5a directed forwards and towards the exterior of the coupling head
   a face 5b directed forwards
   a face 5c directed forwards and towards the interior of the coupling head
   a face 5d which is horizontal the group of faces 3a, 3b, 3d and 3e of the horn 3 and directed upwards comprises:
   a face 3a directed towards the interior
   a horizontal face 3b
   a face 3d directed towards the exterior and terminating at the forward point of the horn
   a face 3e directed towards the exterior.

The faces 5f and 6b are called "corresponding faces for effecting angular agreement in the vertical plane" (in a direction of torsion) in the sense that the face 5f of one head must contact the face 6b of the other head to effect the angular agreement of the heads in the vertical plane, for one of the two possible directions of torsion.

The faces 7a and 3a are corresponding faces for effecting angular agreement in the vertical plane in the other direction of torsion. The same applies to the group of faces 3a, 3d and 3e with the group of faces 5e and 7b.

The faces 5a, 5b and 3a are corresponding faces to effect agreement of level.

The same applies to the faces 5c, 7b and 3d, and to the faces 5c and 3e.

The faces 3c and 4 are corresponding faces for effecting angular agreement in the horizontal plane.

Finally the faces 5e and 6a of the coupling head are called "corresponding faces for effecting rigidification" in the sense that the face 5e of the one head must contact the face 6a of the other head in order to effect or contribute to the rigidification of the coupling.

The faces 5d and 3b are also corresponding faces to effect rigidification.

Among these faces, it should be observed that the faces 5e, 6a, 3b and 5d are intended exclusively for rigidification, whereas the faces 5f and 6b are intended exclusively for effecting angular agreement in the vertical plane for one direction of torsion, and the face 7a is intended exclusively for effecting angular agreement in the vertical plane for the other direction of torsion, and moreover the faces 3c and 4 are intended exclusively for effecting angular agreement in the horizontal plane, whereas the faces 5b and 5a are intended exclusively for effecting agreement of level, whereas the faces 3a, 3d and 3e of the horn and directed upwards, and the face 7b, are intended for the double purpose of effecting an agreement of level and an agreement of angle in the vertical plane.

In what has been said above, a face "directed towards the interior" is a face which is oriented in such a way that a straight line perpendicular to the general plane of the face is directed towards the vertical plane which passes through the longitudinal axis of the head, whereas a face "directed towards the exterior" is a face which is so orientated that a straight line perpendicular to the general plane of the face is directed away from this vertical plane.

If the straight line leaving the face perpendicularly to the general plane of the face is not horizontal but is inclined upwards (or downwards), then this face is said to be "directed upwards" (or "directed downwards").

Corresponding faces of the coupling head have corresponding slopes. Thus the faces 5e and 6a are horizontal, and so are the faces 3b and 5d. On the other hand the faces 6d and 5f both have the same slope but one of them rises in the forward direction whereas the other descends in the forward direction. The same applies to the faces 3a and 7a. The faces 3c and 4 are both vertical.

The particularities and advantages of the coupling head according to the invention will now be described on the basis of FIGURES 1 to 32, particularly the dimensional characteristics which allow this head to be coupled to the Russian coupling head of type SA 3, while still retaining particularly small overall dimensions in the coupling head.

On the various figures the references X, Y and Z (or X', Y' and Z') refer to the axes of the coupling heads.

Thus the height k of the small grip 2 above the axis X is 200 mm., the upper horizontal plane 3b of the horn 3 is n=180 mm. below this axis, and the lower end of sloping face 3a of the horn is l=235 mm. below this axis. Moreover the vertical wall 3c of the rear edge of the horn preferably has a height m of at least 45 mm., to ensure a positive contact between this horn and the corresponding surface on the other head.

Under these circumstances, and as will be clarified further below, if the head is intended to provide a horizontal field of action of ±220 mm. and a vertical field of action of 150 mm., then its dimensions can be approximately as follows:

total height: 480 to 510 mm.
maximal height below axis (for the percussion face 4): 310 mm.
total width: 560 mm.

Figure 6:
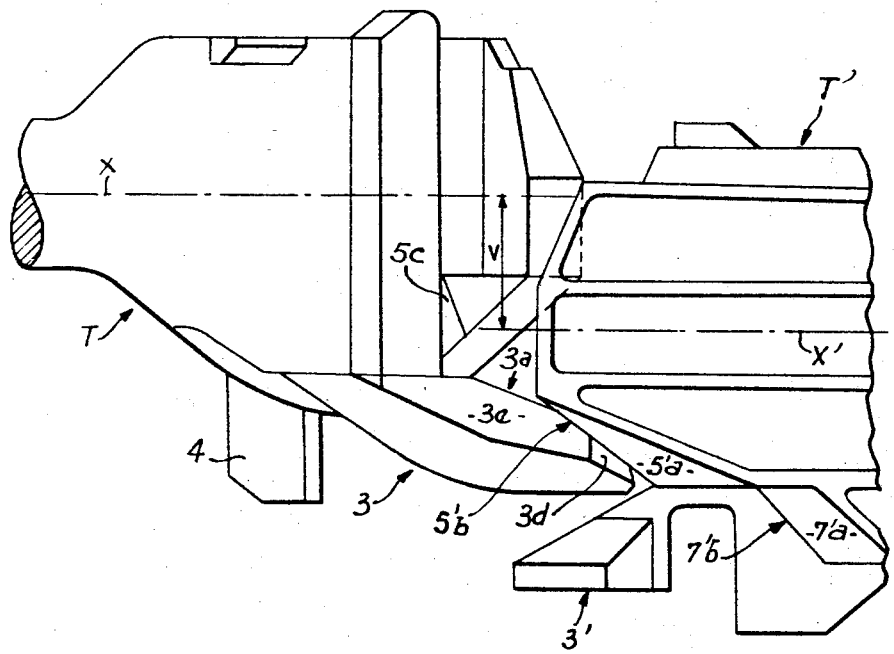
FIGS. 6 and 7 are views from the side showing in each case two coupling heads according to the invention of the type shown in FIG. 1, and these two figures show two different positions involving vertical displacement between the two coupling heads.
Figure 7:
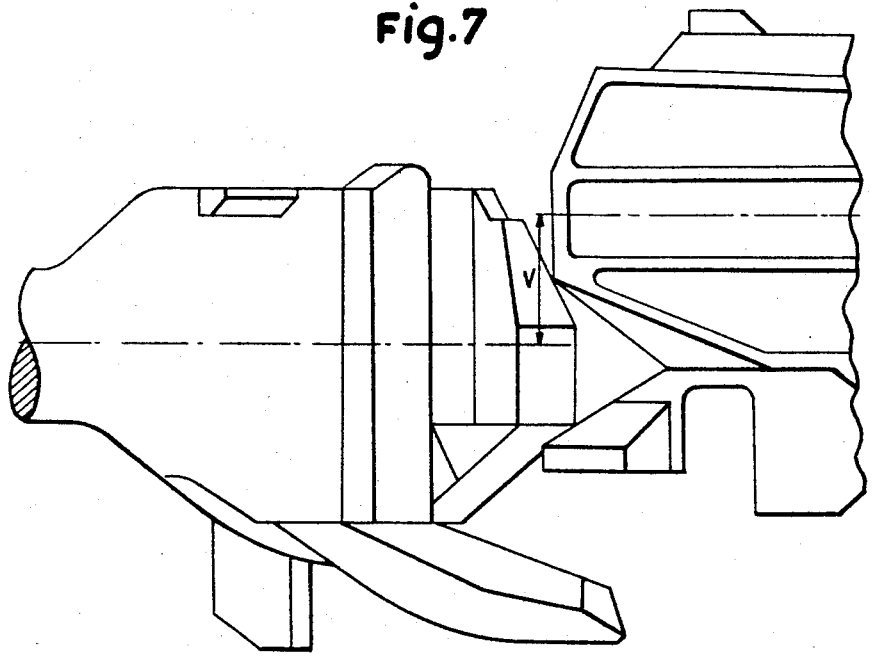

If two coupling heads of the type shown in FIG. 1 approach each other with a certain amount V of relative vertical displacement as shown in FIGS. 6 and 7, the sloping faces 3a, 3d, 3e of the horn 3 of the head T slide along the sloping faces 5'a, 5'b, 5'c, 7'a, 7'b of the large grip of the other head T' and thus the two heads come into correct engagement with each other.

FIG. 4 shows a coupling head T of the type considered here and also shows the small grip 2' and the longitudinal axis Z' of the other similar head T', whereby these two heads are shown in the drawing in their two limiting positions for initial contact.

In the one limiting position, represented by the upper part of the figure, the initial contact between the two heads takes the form of contact between the end of the large grip 1 of the head T and the small grip 2' of the other head T'. This corresponds to a displacement A of 180 mm. between the longitudinal axes Z and Z' of the two heads.

In the other position represented in the lower part of the figure the initial contact is between the front face of the horn 3 of the head T and the small grip 2' of the head T'. This corresponds to a displacement B of 260 mm. between the longitudinal axes Z and Z' of the two coupling heads.

It will be seen that when the head T' starts out from the one or the other of these two limiting positions and is pushed in the direction of the head T, the head T' becomes displaced in the direction of the arrow until the two axes Z and Z' coincide at the instant when the two heads finally couple rigidly together.

By definition, the sum of the two displacements A+B, that is to say 440 mm., represents the "total" horizontal field of action.

However, instead of this "total" field of action it is customary to consider the field of action relative to the axis of symmetry of the coupling head, and expressed in this way the horizontal field of action (A+B) is 220 mm., whereby it is necessary to add the appropriate sign, that is to say plus or minus.

It should be observed that the two limitnig positions of the axis Z' of the head T' (FIG. 4) are not symmetrical relative to the axis Z of the coupling head T, as expressed by the fact that the two displacements are 180 and 260 mm.

In order to relate the values of A and B to the value of the field of action, that is to say 220 mm., the two coupling heads are assumed to have the positions shown in FIG. 5, whereby between the axes Z and Z' of the coupling heads and the axis W of the wagon there is a displacement R of 20 mm., on each side of the axis W. Under these circumstances the value of A becomes 180+20+20=220 mm. and the value of B becomes 260−20−20=220 mm.

An interesting detail of the invention is that the front face of the initial profile is advanced through a distance d=90 mm., and the front face 3c of the horn (FIG. 3) is advanced.

These two modifications have the result that (FIGS. 6 and 7) the contact actions of the faces of the horn of the one head and the faces under the grip of the other head are advanced.

In the position shown in FIG. 6 the head T' is lower than the head T and the horn 3' of the head T' is lower than the percussion face 4 of the head T.

In order to facilitate the action of the horn on this face before the full engagement of the coupling heads, as shown in FIG. 8, the contact between the two heads must take the form of contact between the upper face 3b of the horn 3 and the lower part 5d of the grip 1' (FIG. 9). In this position the heads are at the same height, and consequently the horn 3' of the head T' is at the same height as the percussion face 4 of the head T.

Figure 11:
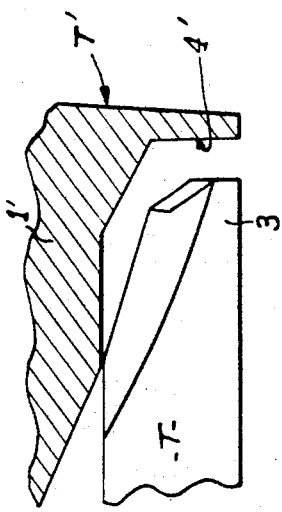
FIG. 11 is a detail seen from the side of the coupling process illustrated in FIG. 10.
Figure 10:
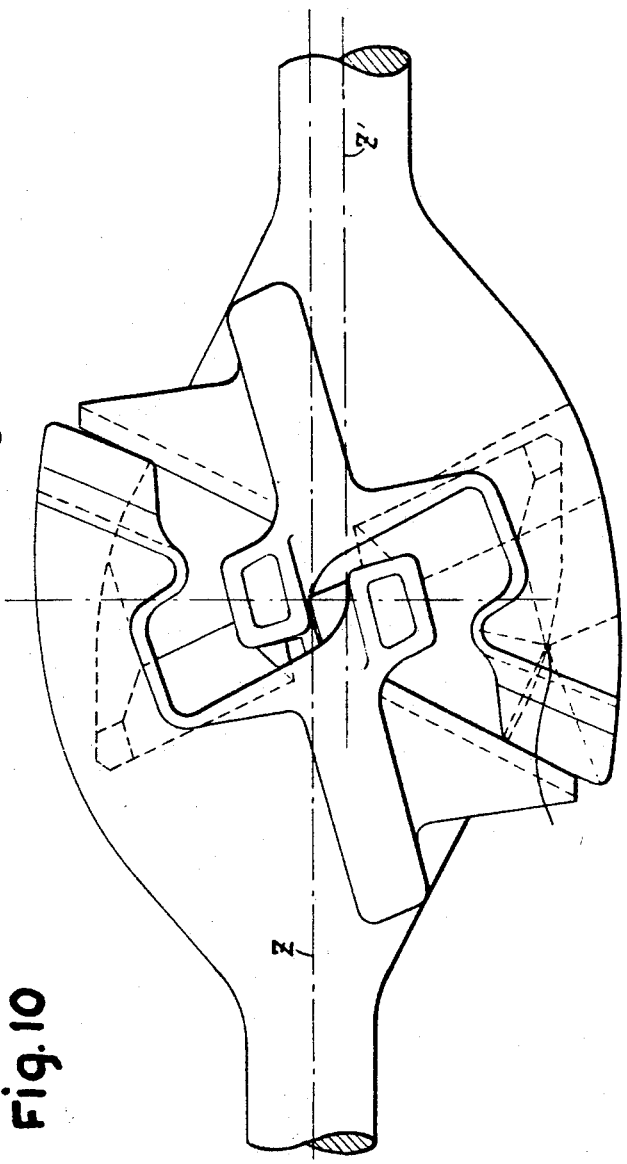
FIG. 10 is a view corresponding to FIG. 8 but in this case the two coupling heads have a horizontal displacement before engagement is achieved.

At the other end of the horizontal field of action, for example starting out with a horizontal displacement as shown in FIG. 4, and still retaining the vertical displacement shown in FIG. 6, the two coupling heads are in the positions shown in FIGS. 10 and 11, whereby the horn 3 of the head T is at the same height as the percussion face 4' of the head T'.

It will be observed that this new characteristic allows the height below the axis of the abutment or percussion face to be reduced.

The functions of the various sloping faces of the invention will now be described in greater detail for various combinations of displacment and relative angle which the two coupling heads can possess.

*The functions of the sloping face in the presence of vertical displacement, starting out from certain positions in the horizontal field of action corresponding to a displacement in the direction of the grip*

Figure 12:
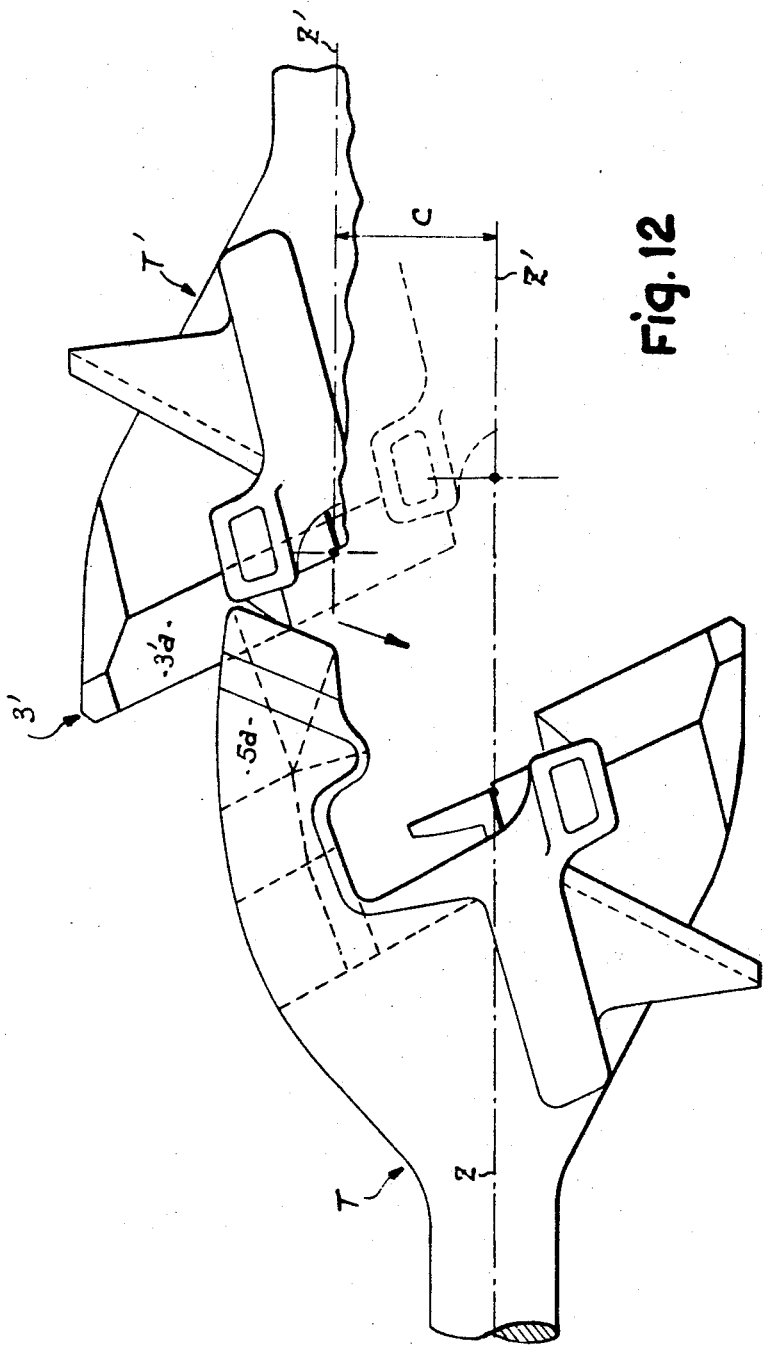
FIG. 12 is a view from above showing two coupling heads, whereby in the one case there is no displacement between their longitudinal axes, whereas in the other case there is a displacement corresponding to one limit of the horizontal field of action, in the direction of the large grip of the one head.

FIG. 12 shows the head T' displaced horizontally by the amount C=220 mm. relative to the head T. If there is also a vertical displacement as shown in FIG. 7, that is to say if the head T' is higher than the head T, the vertical readjustment is effected by the faces 3'a of the horn 3' and 5a under the grip 1. Simultaneously the adjustment for horizontal displacement is obtained by movement of the head T' in the direction of the arrow, until the instant when the axes Z and Z' of the two heads T and T' come to coincide.

It is a characteristic of the coupling head according to the invention that for all horizontal displacements between 220 and 0 mm. the vertical adjustment of the one head relative to the other is always effected by the action of sloping faces, for example the sloping face 3a of the horn of the one head co-operating with corresponding sloping faces, for example the sloping face 5a situated under the large grip of the other head, whereby the two heads are brought into vertical agreement with each other.

Figure 13:
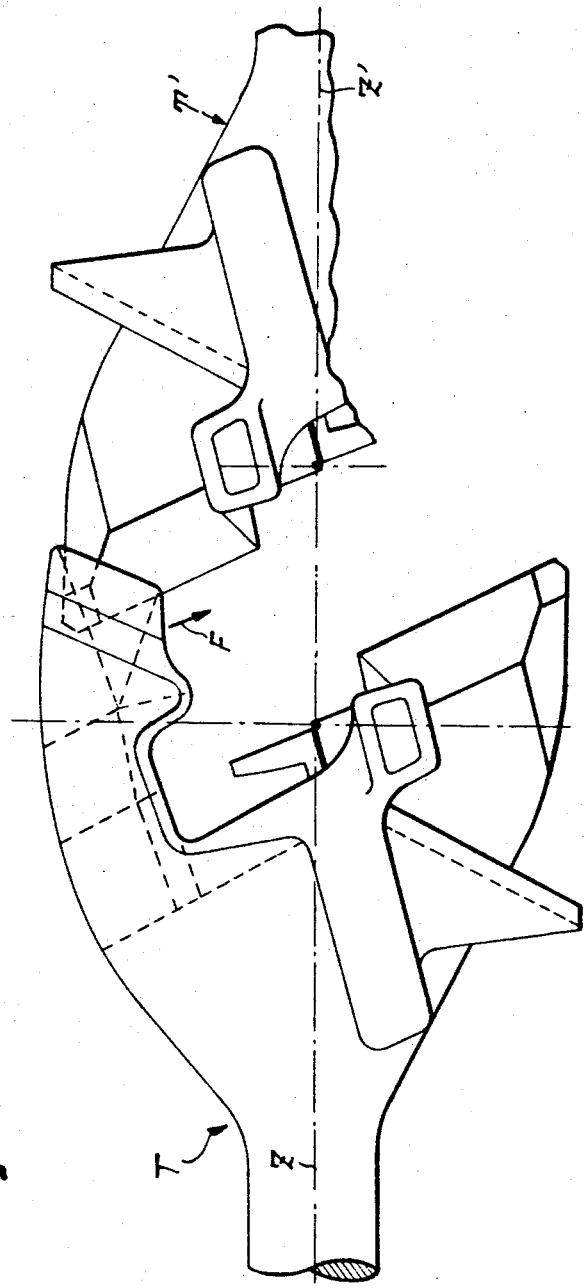
FIG. 13 is a view from above of the two coupling heads in other relative positions for co-operation.

On the other hand, the angles and directions of the surfaces 3a of the horn and 5a under the grip are such that starting out from a displacement such as that in FIG. 13 the heads slide along the surfaces in the direction of the arrow F, and consequently the two heads approach each other transversely and cannot separate from each other in this sense.

*The functions of the sloping faces in the presence of a vertical displacement, starting out from certain positions in the horizontal field of action corresponding to a displacement towards the horn side*

Figure 14:
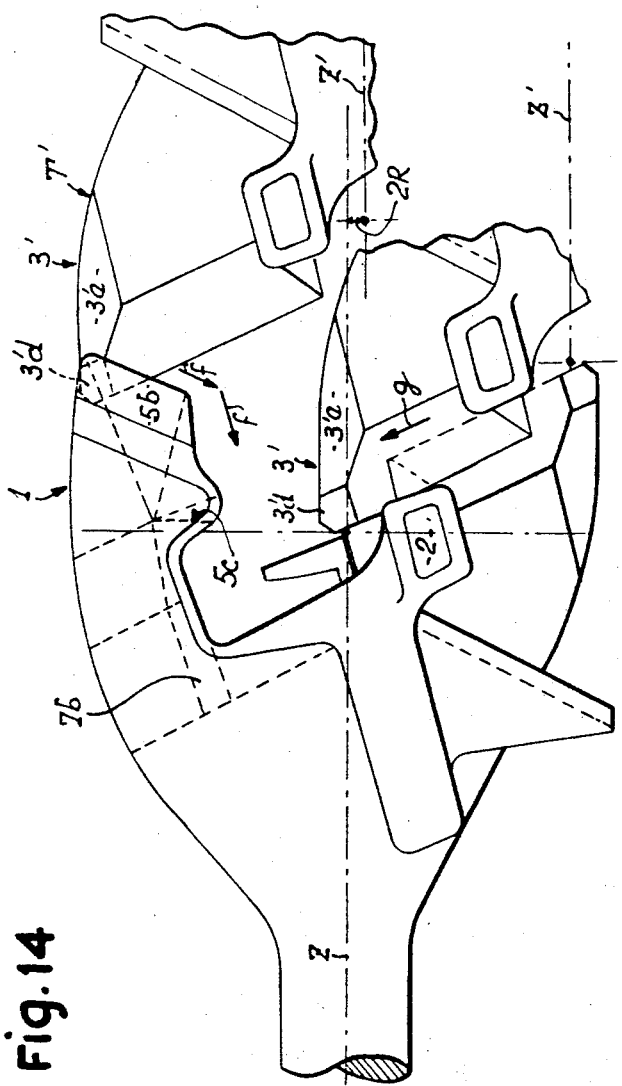
FIG. 14 is a view from above of two coupling heads and in this case there is a displacement between the longitudinal axes which amounts either to zero or to one limit of the horizontal field of action in the direction of the horn of one head.

FIG. 14 shows the two heads displaced horizontally by the amount $D=2R$ (the head T' is in the higher position) or by the amount $D=220$ mm. (the head T' is in the lower position).

In the first case contact occurs between the sloping faces $3'a$ of the horn $3'$ and $5b$ under the large grip 1. If the head T' is higher than the head T, corresponding to the vertical displacement of FIG. 7 the head T' moves horizontally in the direction of the arrows $f$ so that at the end of this movement the sloping faces $3'e$ of the horn $3'$ co-operates with the face $5c$ under the grip, and the sloping face $7b$ under the grip co-operates with the sloping face $3'd$ of the horn, in such fashion that the two heads are moved into vertical agreement with each other.

At the other end of the field of action, as reprsented by the lower part of the FIG. 14, front end of the horn $3'$ of the head T' comes into contact with the rear face of the prismatic grip 2 of the head T, and consequently the heads slide in the direction of the arrow $g$, whereby the vertical adjustment is affected by co-operation between the sloping faces $3'd$ and $3'e$ of the horn and the sloping faces $7b$ and $5c$ under the grip 1.

*Angular adjustment in the vertical plane, or torsional adjustment of heads at the same level*

FIGS. 15 and 16 show the two heads T and T' so positioned that there is a positive angle between their axes X and X'.

In this case the sloping face $5'f$ on the front face of the large grip $1'$ of the head T' co-operate with the sloping surface $6b$ of the appendix 6 situated behind the small grip 2 of the head T, and at the same time the sloping surface $6'b$ of the appendix behind the small prismatic grip of the head T' co-operates with the sloping surface $5f$ of the front face of the large grip 1 of the head T, with the result that when the two heads T and T' approach each other there occurs a correcting torque as shown by the arrows F and F'. This torque adjusts the positions of the heads and brings their axes X and X' into line with each other.

In the case of the positions shown in FIGS. 17 and 18 which show the coupling heads T and T' with a negative angle between their axes X and X', readjustment is effected by co-operation between the sloping faces under the grip and those on the horn of the other coupling head. When the two heads approach each other there arises a correcting torque (represented by the arrows F and F') which here again corrects the positions of the heads so as to bring their axes X and X' into line.

*Torsional correction of heads which are vertically displaced*

In FIGS. 19 and 20 the head T is lower than the head T' by a vertical displacement V, and there is a positive angle $\alpha$ between the two heads.

The adjustment for torsion is effected by co-operation between the sloping surface $5'f$ on the front face of the large grip $1'$ of the head T', and the sloping surface $6b$ of the appendix 6 situated behind the small grip 2 of the head T. Once the heads have been corrected in angle, that is to say once their vertical axes are brought into parallel planes, they are moved vertically into agreement by co-operation between the sloping faces of the horn and the sloping faces under the grip, as already described.

In FIGS. 21 and 22, the head T is lower than the head T' by the vertical distance V, and there is a negative angle $\alpha$ between the two heads. The torsional adjustment is obtained by co-operation between the sloping faces situated under the large grip and those situated on the horn, whereby this torsional adjustment is effected either in front of the grip or behind the grip depending on the value of the vertical field of action.

Just as in the case of FIGS. 19 and 20, these sloping faces produce a correcting torque as represented by the arrows F and F', the effect of which is to readjust the heads into position and bring their vertical axes Y and Y' into line, whereupon the two heads are moved vertically into agreement by co-operation of the sloping faces as already described above.

*Angular readjustment in the horizontal plane in the case of heads level with each other*

In FIG. 24 the two coupling heads T and T' are at the same level, but their longitudinal axes are angularly displaced by 12°, in one direction or the other.

In this case there is an angular misalignment between the axes of the two coupling heads in the horizontal plane, whereby the coupling heads are assumed to be articulated to their wagons at O and O' (FIG. 25). Under these circumstances the point of contact $p$ of the horn $3'$ of the coupling head T' with the percussion face 4 of the head T must always be inside the fictitious line OO' which joins the axes of articulation of the two coupling heads, in such fashion that there arises a correcting coupling tending to re-align the heads (FIG. 25). What is required is that the angle $\alpha$ thus formed must be more than 12° in the case of the coupling heads of the type discussed here.

FIGS. 24 and 25 represent the case of a negative angle of 12°, but the argument applies equally to the case of a positive angle of 12°. The correction is provided by contact between the surface $p'$ of the horn of the head T and the percussion face of the head T', whereby the two heads are re-aligned under the same conditions.

*Angular readjustment in the horizontal plane, for the case of heads which are vertically displaced*

In FIG. 6 the head T' is lower than the head T.

Co-operation between the sloping faces first of all causes the heads to adjust themselves vertically by co-operation between the upper surface of the horn and the lower surface of the grip (see FIGS. 8 and 9). After that, the horn being now level with the percussion face, the angular readjustment takes place in the horizontal plane as already described above.

In the presence of a vertical displacement V between the two heads, and assuming that the head T' is lower than the head T (FIG. 6), and is at the other end of the horizontal field of action (see FIG. 4), co-operation between the sloping surfaces of the horn and of the grip first of all causes the heads to move vertically until contact takes place between the upper surface of the horn and the upper surface of the grip (FIGS. 10 and 11), and after that the angular adjustment in the horizontal plane is obtained simultaneously by co-operation between the surface $p$ of the horn and the percussion face.

*Angular readjustment in the horizontal plane, for the case of heads which are at the same level but are at an angle to each other in the vertical plane*

FIG. 23 shows two heads which are on the same level but are angled by a negative angle of 12° with respect to each other in the horizontal plane, and also by a positive angle $\alpha$ of 12° in the vertical plane, just as in the case of FIGS. 15 and 16.

When the two heads approach each other, then, irrespective of their positions in the horizontal field of action, the heads are somewhat in the positions shown in FIG. 23.

The first correction which takes place is angular readjustment in the vertical plane as shown in FIGS. 15 and 16. Subsequently, while the two heads are engaging, and bearing in mind that their axes have been corrected, the end of the horn comes into contact by its face $p$ (FIG. 25) against the percussion face of the other head, and this finally effects the angular readjustment in the horizontal plane.

In the case of a positive horizontal angle the process is the same but of course reversed.

*Angular readjustment in the horizontal plane, for the case of heads which are vertically displaced and are also at an angle to each other in the vertical plane*

The heads are assumed to be vertically displaced by the amount V as shown in FIGS. 19 and 20, and also displaced through an angle $\alpha=12°$ in the horizontal plane (as shown in FIG. 23), and also displaced through a positive angle of 12° in the vertical plane.

The first adjustment movement is an adjustment in torsion by co-operation of the sloping face $5'a$ which is situated on the front face of the large grip 1', and the sloping face $6b$, respectively on the one head and on the other.

The second movement is a vertical adjustment by co-operation of the sloping faces of the horn with those under the grip, respectively on the one head and on the other.

At this instant the heads, which have been readjusted in the vertical plane and are at the same level, are adjusted angularly as already described for FIG. 25, by co-operation between the surface $p$, which is situated at the end of the horn, with the percussion face of the other head.

If the angle $\alpha$ was positive, the other positions remaining unchanged, the same process takes place in symmetrically opposite directions, unless the first readjustment, for torsion, is provided by co-operation of the sloping faces $5f$ with the sloping faces $6'b$ (FIGS. 19 and 20).

Now let us suppose that the coupling heads are displaced vertically by the amount V, as shown in FIGS. 21 and 22, forming a negative angle $\alpha$ of 12° in the horizontal plane, as shown in FIG. 23, and a negative angle of 12° in the vertical plane.

The first process performed is a torsional adjustment in which the sloping faces of the horn of the one head co-operate with those under the grip of the other head.

The second operation performed is vertical readjustment effected similarly.

The heads have now been adjusted in the vertical plane and are at the same level. Angular adjustment is now effected as shown in FIG. 25, by co-operation between the horn of one head and the percussion face of the other.

If the two heads make a positive angle with each other, the other positions remaining the same, the operations are performed as described above.

*Rigidification.*—The coupling is rigidified by engagement between the upper faces $1b$ of the large grips and the lower faces $6a$ of the appendices situated behind the little grips, and also by engagement between the upper faces $3b$ of the horns with the lower faces $5d$ of the large grips (FIGS. 26 and 27).

This engagement always takes place before the introduction of the small prismatic grip into the base of the large grip. This is to allow a sliding in the direction of the arrow (FIG. 28) to lock the two heads together while at the same time preventing any relative vertical movement during the final locking process.

The heads T and T' are now in vertical adjustment at the same level (FIG. 29). For the final locking process it is merely necessary to bring them together through a distance S.

*Coupling with the SA 3.*—As already described it is desirable to arrange the head so that it can be coupled directly with the Russian coupling head type SA 3.

These Russian heads have a lateral hook 8 (FIG. 31) and a corresponding recess can very well be provided in the front part of the large grip of the coupling head according to the invention, to accommodate the hook 7 when the two heads are coupled.

This recess can subsequently be eliminated when new heads cast in the USSR are introduced which do not have this hook, and with the elimination of the existing hooks, which were necessary only for coupling the Russian head with the customary hook.

It should be understood that the coupling head according to the invention can be equipped with compressed air connections and with locking arrangements and advancing arrangements for the couplers which might be necessary for its operation and which are represented diagrammatically at 10 and 11 in FIG. 1.

As an example the following is a list of the general characteristics of a version of a coupling head according to the invention:

(a) vertical field of action of 150 mm., including torsion
(b) horizontal field of action of ±220 mm.
(c) angular adjustment in the horizontal plane of ±12°
(d) angular adjustment in the vertical plane of ±12°
(e) rigidification
(f) possibility of coupling with the head type SA 3
(g) possibility of equipping with one or two air couplers

*Overall dimensions*

(h) total height=480 mm. on the horn side and 510 mm. on the percussion face side
(i) height above the axis of the arm: 200 mm.
(j) height below the axis of the arm: 280 mm. on the horn side and 310 mm. on the percussion face side
(k) total width of 560 mm.

I claim:
1. An automatic coupling head for use in conjunction with central buffing and draft gear for railway vehicles; said coupling head being of the type having on its front face a large coupling grip in the form of a hook, a small coupling grip in the shape of a prism, a horn projecting obliquely forwardly from underneath the small grip, and a vertical abutment face situated underneath and behind the large grip;

the coupling head being characterised by a forward appendix situated on the front face of the large grip and having a group of faces directed upwardly to provide rigidification and angular agreement between two such heads in the vertical plane; and a group of faces directed downwardly to provide rigidification, angular agreement between the two heads in the vertical plane, and coincidence of level; and by a rear appendix situated behind the small grip and having a group of faces directed downwardly to provide rigidification and angular agreement between the two heads in the vertical plane; said horn having a vertical face directed forwardly and inwardly to effect angular adjustment in the horizontal plane; and a group of faces directed upwardly to provide rigidification, angular adjustment in the vertical plane, and adjustment of level, said upwardly directed group of faces of the forward appendix including a horizontal face ($5e$) for rigidification and a face ($5f$) sloping downwardly and forwardly for angular adjustment in the vertical plane; said downwardly directed group of faces of the forward appendix including a horizontal face ($5d$) for rigidification, a face ($5a$) directed forwardly and outwardly, and another face ($5b$) directed forwardly for adjustment of level; said downwardly directed group of faces of the rear appendix including a horizontal face ($6a$) for rigidification and a face ($6b$), sloping downwardly toward the rear with the same slope as the said face ($5f$) sloping downwardly and forwardly of the forward appendix, for angular adjustment in the vertical plane; said upwardly directed group of faces of the horn including a horizontal face ($3b$) for rigidification and an inwardly directed face ($3a$) for angular adjustment in the vertical plane and for adjustment of level; and wherein there is under the large grip a face (7a) having the same slope as the said inwardly directed face (3a) of the horn but directed forwardly and downwardly for angular adjustment in the vertical plane.

2. A coupling head according to claim 1, in which said group of upwardly directed faces of the horn further includes, for angular adjustment in the vertical plane and for adjustment of level, a face (3e) directed outwardly and a face (3d) situated at the forward point of the horn and directed outwardly, and in which said group of downwardly directed faces of the forward appendix includes a corresponding face (5c) directed forwardly and inwardly for adjustment of level and for angular adjustment in the vertical plane.

References Cited

UNITED STATES PATENTS 3,164,266   1/1965   De Penti et al. _____ 213—100

FOREIGN PATENTS 1,385,829   12/1964   France.

DRAYTON E. HOFFMAN, *Primary Examiner.*